Aug. 27, 1963  S. G. OSBORN  3,101,849
DISPLAY RACK

Filed March 5, 1962  3 Sheets-Sheet 1

SCOTT G. OSBORN
INVENTOR.

BY *[signature]*

Aug. 27, 1963
S. G. OSBORN
3,101,849
DISPLAY RACK
Filed March 5, 1962
3 Sheets-Sheet 2
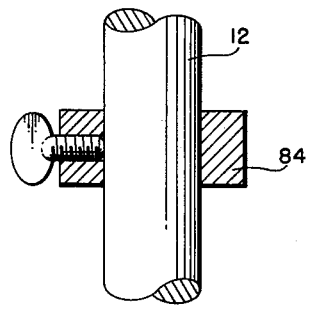
FIG__5
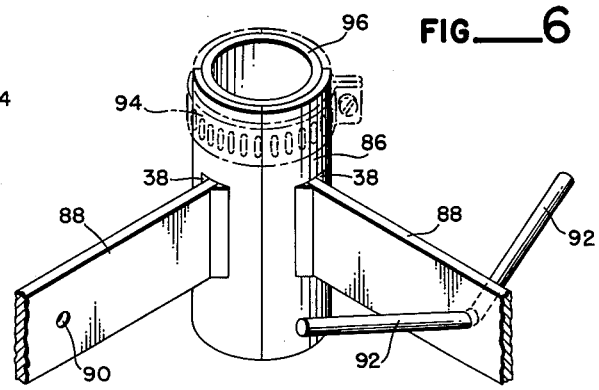
FIG__6
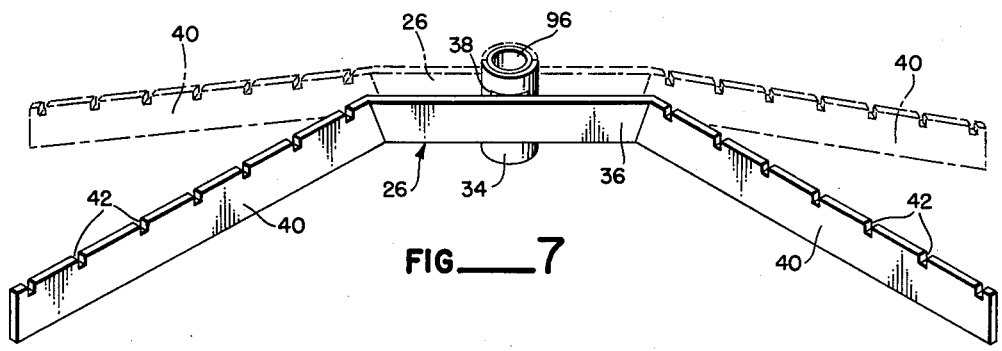
FIG__7
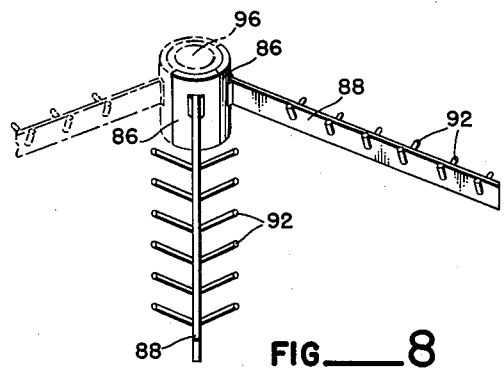
FIG__8
SCOTT G. OSBORN
INVENTOR.
BY Aug. 27, 1963  S. G. OSBORN  3,101,849
DISPLAY RACK
Filed March 5, 1962  3 Sheets-Sheet 3
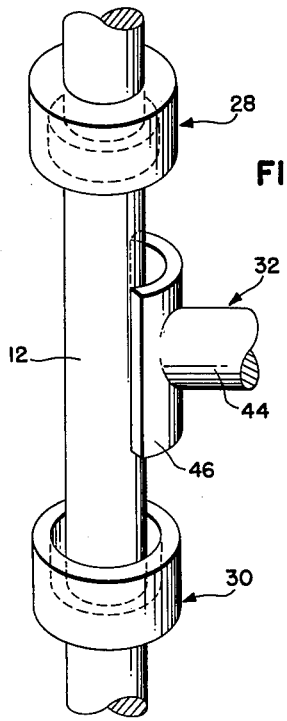
FIG.__9
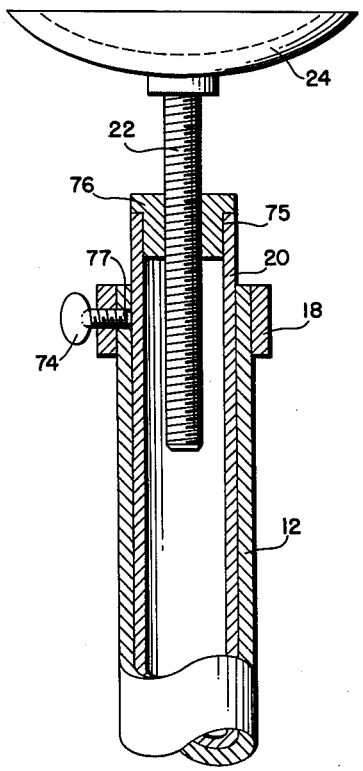
FIG.__10
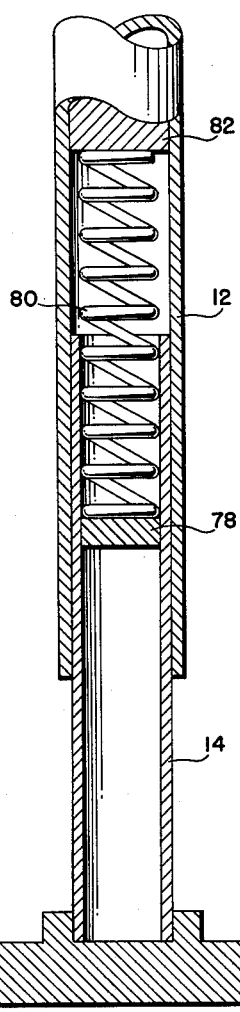
FIG.__11
SCOTT G. OSBORN
INVENTOR.
BY

3,101,849
DISPLAY RACK
Scott G. Osborn, Seattle, Wash.
(3453 74th Place SE., Mercer Island, Wash.)
Filed Mar. 5, 1962, Ser. No. 177,950
3 Claims. (Cl. 211—166)

This invention relates to a new and useful concept in an all purpose display rack.

This invention is designed to minimize the problems attendant upon setting up displays in sample rooms, retail display windows and store interiors. Modern merchandising requires mobility and, in terms of on-the-road merchandising, this means having equipment which knocks down, is compact, can be easily and quickly set up in hotel display or sample rooms, and which is very versatile and attractive. Merchandising mobility in the stores, whether in the window or on the floor, also means being able to change displays with a maximum of convenience.

Accordingly, it is an object of this invention to provide a display rack which is adjustable to a wide range of ceiling heights.

Another object of this invention is to furnish a display rack which may be assembled and set up wherever desired in a matter of minutes.

Yet another object of this invention is to provide a display rack which is attractive in appearance, rugged in construction, simple in design and inexpensive to manufacture.

Still another object of this invention is to supply a display rack which is adaptable to any display location, whether it be a corner or the center of a display area.

A further object of this invention is to provide a display rack which has rotating cross arms and which arms may be located at any point on the main supporting column.

Yet another object of this invention is to provide a display rack which utilizes simple locking collars to locate various types of cross arms at any desired point on the main supporting column.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 5 is an elevational cross sectional view of an alternative form of supporting collar;

FIGURE 6 is a perspective view of an alternative form of arm structure showing the sleeve and a screw strap clamp means for holding the brackets against the sleeve;

FIGURE 7 is a perspective view of one type of display arm used in this invention;

FIGURE 8 is a perspective view of an alternative form of arm structure which is partially shown in FIG. 6;

FIGURE 9 is a partial view in perspective of a supporting bracket for a horizontal crossbar;

FIGURE 10 is an elevational cross section view of the ceiling end of the central support column showing the telescopic extension arrangement with extension locking collar and screw adjustment; and FIGURE 11 is an elevational cross section view of the floor end of a central support column showing the floor and resilient spring support means.

Figure 1:
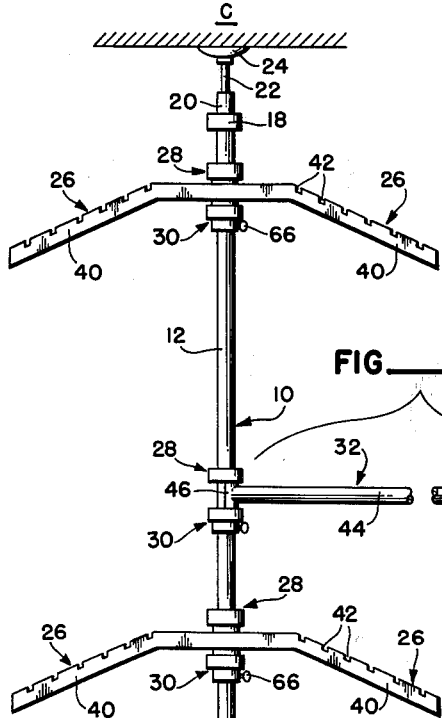
FIGURE 1 is an elevational view showing a complete floor-to-ceiling display rack together with a horizontal bar and a partial view of another floor-to-ceiling rack.

Referring now to FIG. 1 it will be seen that the display rack of this invention, generally designated by number 10, is comprised of a central, vertical, hollow support column, shaft or tube 12 which extends substantially the full distance between floor F and ceiling structure C. The lower end of the shaft 12 houses a compression spring means (to be more fully described hereinafter) which spring in turn bears against the upper end of leg 14 which is telescopically received in said tube 12. The lower end of leg 14 rests on base or floor plate 16.

The upper end of shaft 12 receives slidably and telescopically the extension shaft 20. Extension shaft 20 is up to 6 feet long and is held securely in place within shaft 12 by a lock screw in the collar 18. Extension shaft 20 is provided to adjust the control column to high ceilings. Extending outwardly from the upper end of extension shaft 20 is an adjustment screw 22 which has attached to the end thereof the ceiling contacting cup 24 which is made of rubber or soft plastic or some other suitably resilient material which will not mar the ceiling surface.

The shaft 12 receives a series of locking collars 28 and 30 for holding crossarms and for anchoring the ends of horizontal bar 32. With the above general description as a guide the various aspects of this invention may now be discussed in more detail.

Figure 2:
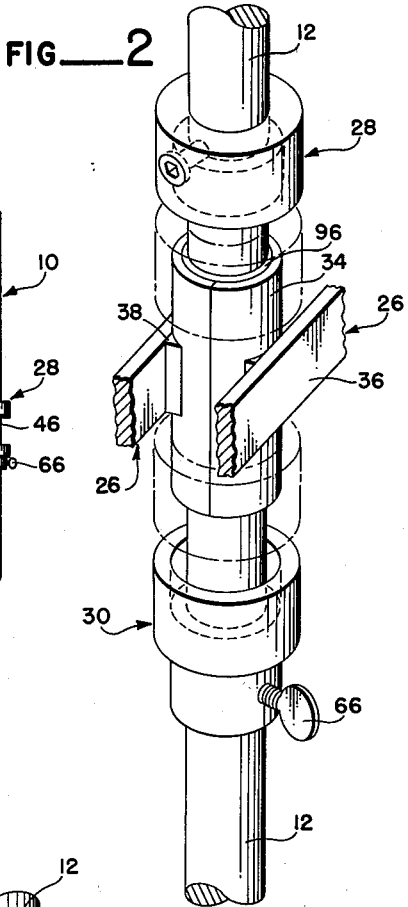
FIGURE 2 is an enlarged partial view in perspective of the central supporting column together with upper and lower anchoring collars and arm supporting collar.

FIG. 2 shows the upper and lower locking collars 28 and 30 slidably received and mounted on shaft 12. Crossarm supporting bracket 34 is a semicircular piece of plate to which the crossarm 26 is welded. That part of the crossarm which is attached to the supporting collar is a substantially horizontal bar section 36. Bar section 36 is rigidly connected to supporting collar 34 by heavy welds 38. It is to be remembered that if the rack is used to display heavy articles the crossarm will have to be very ruggedly attached to the supporting collar in order to resist the considerable amount of twisting and shear stresses involved.

FIG. 7 shows a complete double crossarm assembly. Each end of the horizontal bar section 36 has attached thereto, either integrally or otherwise, an outwardly and downwardly extending arm 40 with notches 42 cut in the upper edge thereof. Arms 40 are also formed of heavy rectangular bar stock. There are no prescribed dimensions for the various parts of the crossarm assemblies. Use of the rack would to a large extent be determinative of dimensions and material employed.

Figure 4:
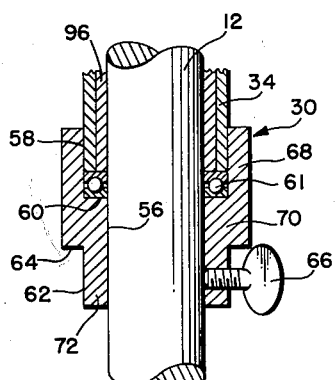
FIGURE 4 is an elevational cross section view of an alternative form of a supporting collar and also showing anti friction bearings in the bottom supporting collars.
Figure 3:
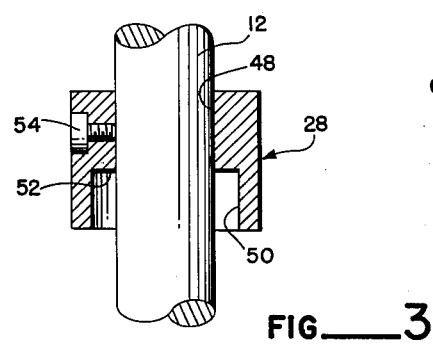
FIGURE 3 is an elevational cross section view of a supporting collar.

FIGS. 3 and 4 illustrate two embodiments of locking collars which may be incorporated with this invention. It is not essential to this invention which form the locking collar takes, since each type may be used, by simply reversing it, either in the upper or lower position. Collar 28 in FIG. 3 is a simple ring. The inside diameter or surface 48 slips over and is slidably received on shaft 12. A portion of the surface 48 is cut away concentrically to form offset surface 50. Thus, there is also formed an annular ledge 52. When the ring is on shaft 12 the annular groove formed by surface 50 and ledge 52 receives the supporting collar 34 of a crossarm. The groove provides a loose fit for such supporting collars so that while the element which the collar supports may revolve around shaft 12, the locking collars prevent any up or down movement on shaft 12. A lock screw 54 secures collar 28 to the shaft 12.

In the same manner, locking collar 30 of FIG. 4, which for purposes of illustration only is shown to be the bottom locking collar, serves a similar function with locking collar 28 and varies only slightly in structure. Collar 30 has inside diameter or tube contacting surface 56. A portion of the inside surface 56 is cut away from one end to form concentric offset surface 58 and ledge 60. Collar 30 has a portion of the outside surface cut away from the other end to form outside offset surface 62 and ledge 64. Thus, said collar comprises a wall 68 radially spaced from shaft 12 to form an annular groove around said tube, a main body portion 70, of which wall 68 is an integral part, and wall 72 which is also an integral part of main body portion 70. Wall 72 threadably receives lock screw 66 which is the means for securing collar 30 to its desired position on tube 12. In either collar 28 or 30 the lock screw may be a thumb screw such as screw 66 in FIG. 4 or an Allen head screw 54 as seen in FIG. 3. FIG. 4 also shows that if desired an antifriction device may be used in the lower collar. For purposes of illustration ball bearings 61 have been included.

FIG. 9 shows that collars 28 and 30 also support the ends of the horizontal crossbars 32. Crossbars 32 comprise the round or tubular bar 44 which has attached to each end thereof the arcuate brackets 46. Brackets 46 are, of course, rigidly attached by their outside surfaces as by welding to the said crossbars 44. The brackets 46 conform to the dimensions of tube 12 so that they may be received in the annular grooves of locking collars 28 and 30 in the same manner as said collars would receive crossarm supporting collars 34.

FIG. 10 shows the upper end of this invention in greater detail. The ceiling end of shaft 12 has a hole 77 near the end to threadably receive the shaft of lock screw 74 which screw is supported in end collar 18. As mentioned above, extension shaft 20 is slidably and telescopically received within shaft 12. Extension 20 permits this display rack to be adjusted to ceilings of various heights whenever they are encountered. When the adjustment is made the top edge of the collar 18 is aligned with the upper end of shaft 12 so that screw 74 may be threaded into hole 77. By tightening the screw 74 against the wall of extension 20, said extension is held firmly in place.

The upper end of extension 20 has tightly inserted or threaded therein the adjustment head 76. Head 76 is roughly T-shaped in cross section and is designed so that when inserted in extension 20 the outer edges of the T are flush with the outer surface of said extension 20. Adjustment head 76 threadably receives through its longitudinal center the adjustment screw 22. Said adjustment screw 22 is 6 or 8 inches long and has attached to its upper end the shallow ceiling contacting cup 24 made of rubber or plastic or other soft resilient material.

It will be understood that when the extension 20 is extended as far as the ceiling will permit and locked, the shaft 12 is further secured by grasping its middle and turning. The turning runs screw 22 out thus pushing the shaft 12 downwardly against compression spring 80 shown in FIG. 11. Screw 22 is held against rotation, of course, because of its rigid attachment to cup 24 which because of the nature of its contact with the ceiling C has sufficient friction to resist the torque between adjustment head 76 and screw 22.

Compression spring 80 shown in FIG. 11 is held between shaft 12 and leg 14 by virtue of abutment 82 within tube 12 and abutment 78 within leg 14. The precise means for confining the spring 80 are not essential to this invention. Hence, any simple, expedient stop or abutment means will be satisfactory so long as it does not impede the sliding telescopic relationship of shaft 12 and leg 14.

FIG. 7 shows that only one cross arm need be attached to a supporting collar since only a single cross arm may be needed if the display rack is to be set up in a corner space.

FIGS. 6 and 8 show an alternative form of display arm. A metal bar or arm 88 is welded as by welds 38 or otherwise secured by one end to an arcuate bracket 86. While brackets 34 for cross arms 26 are 180° arcs, the brackets 86 for arms 88 are 90° arcs. Thus, four of arms 88 may be supported between an upper and lower locking collar. The arms 88 are provided with holes 90 through which are inserted the small diameter metal rods 92. As can be seen the rods 92 are bent upwardly and are fixed in place by light welds.

FIGS. 2, 4, 6, 7 and 8 show that the arcuate brackets, to which the arms are attached, when mounted on the shaft 12 do not come in contact with said shaft. Rather, the brackets abut a cylindrical bushing or sleeve 96 which facilitates turning of the arms when this rack is completely assembled.

Other features of this invention are an antifriction device, shown by ball bearings 61 in FIG. 4, in the lower collar. Such antifriction device is optional since it has been found that the combination of the arcuate brackets and the sleeve 96 journal in the annular collar grooves without binding. FIG. 6 shows in dotted lines that conventional steel straps 94 may be employed to hold the brackets to the sleeve 96. In such an instance a locking collar 84 in the shape of a simple ring, such as is shown in FIG. 5, may be used as the lower supporting collar. However, this arrangement is less attractive than when using collars 28 and 30.

Setting up applicant's display rack first requires slipping the desired locking collars and sleeves onto shaft 12. Then the shaft 12 is placed upright on base 16, extension 20 is run outwardly until cup 24 contacts the ceiling and then said extension is locked in position by screw 74. The shaft 12 is then turned forcing adjustment screw 22 outwardly against the force of compression spring 80 to tighten the entire central column 10 firmly in place. The various collars may then be raised to the desired heights and tightened when the display arms have become mounted. Placing a horizontal crossbar 44 in firm position between two central columns 10 involves a minimum of trouble. Of course, appropriate locking collars 28 and 30 would have been placed on shafts 12. Sleeves 96 may be used with brackets 46 if desired though it is not necessary. (See FIG. 9.)

The foregoing is considered as illustrative only of the principle of this invention. Since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:
1. For an all purpose display rack: an upright column; sleeve means on said column; bracket means to be received against said sleeve means, said bracket means supporting display arms; and locking collar means for holding said bracket means against said sleeve means and for permitting said sleeve means and bracket means to rotate relative said column.

2. For an all purpose display rack: an upright column; cylindrical sleeve means on said column; arcuate bracket means to be held against said sleeve means, said arcuate bracket means supporting display arms; and locking collar means for holding said arcuate bracket means against said sleeve means, said locking collar means permitting rotation of said sleeve and arcuate bracket means relative said column.

3. For an all purpose display rack, the combination consisting of: an upright column; sleeve means on said column; bracket means to be held against said sleeve means, said bracket means supporting display elements; and locking collar means for holding said bracket means in abutting relationship with said sleeve means, said locking collar means permitting rotation of said sleeve and bracket means relative said column.

References Cited in the file of this patent

UNITED STATES PATENTS

| | | |
|---|---|---|
| 1,065,381 | Martin | June 24, 1913 |
| 2,799,543 | Tomaselli | July 16, 1957 |
| 2,903,227 | Key | Sept. 8, 1959 |
| 2,980,261 | Young | Apr. 18, 1961 |